United States Patent
Phillips et al.

(10) Patent No.: US 9,721,252 B2
(45) Date of Patent: **\*Aug. 1, 2017**

(54) USER AUTHENTICATION METHOD AND DEVICE FOR CREDENTIALS BACK-UP SERVICE TO MOBILE DEVICES

(71) Applicant: MasterCard International Incorporated, Purchase, NY (US)

(72) Inventors: Simon Phillips, York (GB); Mark Britten, Sevenoaks (GB); Mehdi Collinge, Mont-Sainte-Aldegonde (BE)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,800

(22) Filed: Oct. 26, 2016

(65) Prior Publication Data
US 2017/0046715 A1 Feb. 16, 2017

Related U.S. Application Data

(63) Continuation of application No. 14/636,619, filed on Mar. 3, 2015, now Pat. No. 9,508,071.

(51) Int. Cl.
| | | |
|---|---|---|
| *G06Q 20/40* | (2012.01) | |
| *G06Q 20/32* | (2012.01) | |
| *G06Q 20/38* | (2012.01) | |
| *H04L 29/06* | (2006.01) | |
| *H04L 9/32* | (2006.01) | |
| *H04W 12/06* | (2009.01) | |

(52) U.S. Cl.
CPC ..... *G06Q 20/40145* (2013.01); *G06Q 20/322* (2013.01); *G06Q 20/327* (2013.01); *G06Q 20/3825* (2013.01); *G06Q 20/38215* (2013.01); *G06Q 20/40* (2013.01); *G06Q 20/4012* (2013.01); *H04L 9/3226* (2013.01); *H04L 63/083* (2013.01); *H04L 63/0861* (2013.01); *H04W 12/06* (2013.01); *G06Q 2220/00* (2013.01)

(58) Field of Classification Search
USPC .................................... 235/380; 705/44, 67
See application file for complete search history.

(56) References Cited

U.S. PATENT DOCUMENTS

| | | | | |
|---|---|---|---|---|
| 2007/0118745 A1* | 5/2007 | Buer | ....................... | G06F 21/34 713/168 |
| 2008/0208744 A1* | 8/2008 | Arthur | ................. | G06Q 20/105 705/41 |
| 2009/0233579 A1* | 9/2009 | Castell | ................. | G06Q 20/105 455/411 |
| 2010/0134248 A1* | 6/2010 | Adams | .................... | G06F 21/35 340/5.83 |

(Continued)

*Primary Examiner* — Allyson Trail
(74) *Attorney, Agent, or Firm* — Buckley, Maschoff & Talwalkar LLC (57) ABSTRACT

Back-up credentials data is stored for a user. A communication channel is established with a mobile device. A cryptogram is received from the mobile device, such that the cryptogram is relayed by the mobile device from an authentication device that interacted with the mobile device. The authentication device is associated with the user. The cryptogram is verified. In response to the verification of the cryptogram, the stored back-up credentials data is made accessible to the mobile device.

20 Claims, 7 Drawing Sheets

(56) References Cited

U.S. PATENT DOCUMENTS

| | | | | |
|---|---|---|---|---|
| 2012/0108208 A1* | 5/2012 | Willis | H04L 63/0853 | 455/411 |
| 2013/0091544 A1* | 4/2013 | Oberheide | G06F 21/45 | 726/1 |
| 2013/0104204 A1* | 4/2013 | Henry | G06Q 40/00 | 726/5 |
| 2013/0212661 A1* | 8/2013 | Neafsey | G06F 21/45 | 726/6 |
| 2014/0195429 A1* | 7/2014 | Paulsen | G06Q 20/382 | 705/44 |
| 2014/0282878 A1* | 9/2014 | Ignatchenko | H04L 63/08 | 726/3 |
| 2014/0365780 A1* | 12/2014 | Movassaghi | H04L 63/0838 | 713/184 |
| 2014/0365782 A1* | 12/2014 | Beatson | G06F 21/32 | 713/186 |
| 2015/0235212 A1* | 8/2015 | Ortiz | G06Q 20/322 | 705/44 |

* cited by examiner

USER AUTHENTICATION METHOD AND DEVICE FOR CREDENTIALS BACK-UP SERVICE TO MOBILE DEVICES

CROSS-REFERENCE TO RELATED APPLICATION

This application is a continuation of and claims priority to co-pending U.S. patent application Ser. No. 14/636,619, filed on Mar. 3, 2015, entitled "USER AUTHENTICATION METHOD AND DEVICE FOR CREDENTIALS BACK-UP SERVICE TO MOBILE DEVICES," which is incorporated herein by reference in its entirety for all purposes.

BACKGROUND

Payment accounts are in widespread use. At a point of sale, such accounts may be used for purchase transactions, and may be accessed by devices such as magnetic stripe cards, contactless or contact integrated circuit (IC) cards (also sometimes referred to as "smartcards"), or payment-enabled mobile devices, such as payment-enabled smartphones. In the case of a payment-enabled mobile device, it may emulate a contactless IC payment card by engaging in an exchange of communications with a point of sale (POS) terminal. The exchange of communications may include transmission of a payment account indicator—PAN ("primary account number") or payment token—from the payment-enabled mobile device to the POS terminal. The POS terminal may then generate a transaction authorization request message, including the payment account indicator, and the transaction authorization request message may then be routed (with de-tokenization if necessary) for approval by the payment account issuer.

According to some proposals, a payment-enabled mobile device may be used to access a number of different payment accounts. A so-called "wallet app" may run on the mobile device to aid the user in managing and selecting among the payment accounts accessible via the mobile device. In such cases, it may be said that the mobile device serves as a "digital wallet."

Of course, it is not unusual for consumers to trade-in, or even lose, their mobile devices. In connection with widespread use of digital wallets based on mobile devices, there may be a need to quickly, securely and easily load relevant payment credentials onto a new device. It would be desirable for such a process that there be very strong authentication of the user, since otherwise a wrongdoer may possibly obtain access to all the legitimate user's credentials.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, a user of a mobile device may be supplied with a separate authentication device that may be used to trigger downloading of back-up credentials data to the mobile device. The back-up credentials data may have previously been securely stored in the computer of a credentials back-up service. The authentication device may generate a cryptogram that is forwarded to the credentials back-up computer via the mobile device to authenticate the mobile device to the back-up computer. The credentials may then be downloaded from the back-up computer to the mobile device.

In some embodiments, the generation of the cryptogram may be preceded by a user authentication process conducted via the mobile device and the authentication device.

In many cases, the user may elect to store the authentication device in a safe place in the user's residence, and may take out and use the authentication device only on the rather infrequent occasions when the user replaces his/her mobile device.

With this approach, there is a high degree of assurance that a mobile device that requests a download of back-up credentials data is actually in the possession of the legitimate user.

Figure 1:
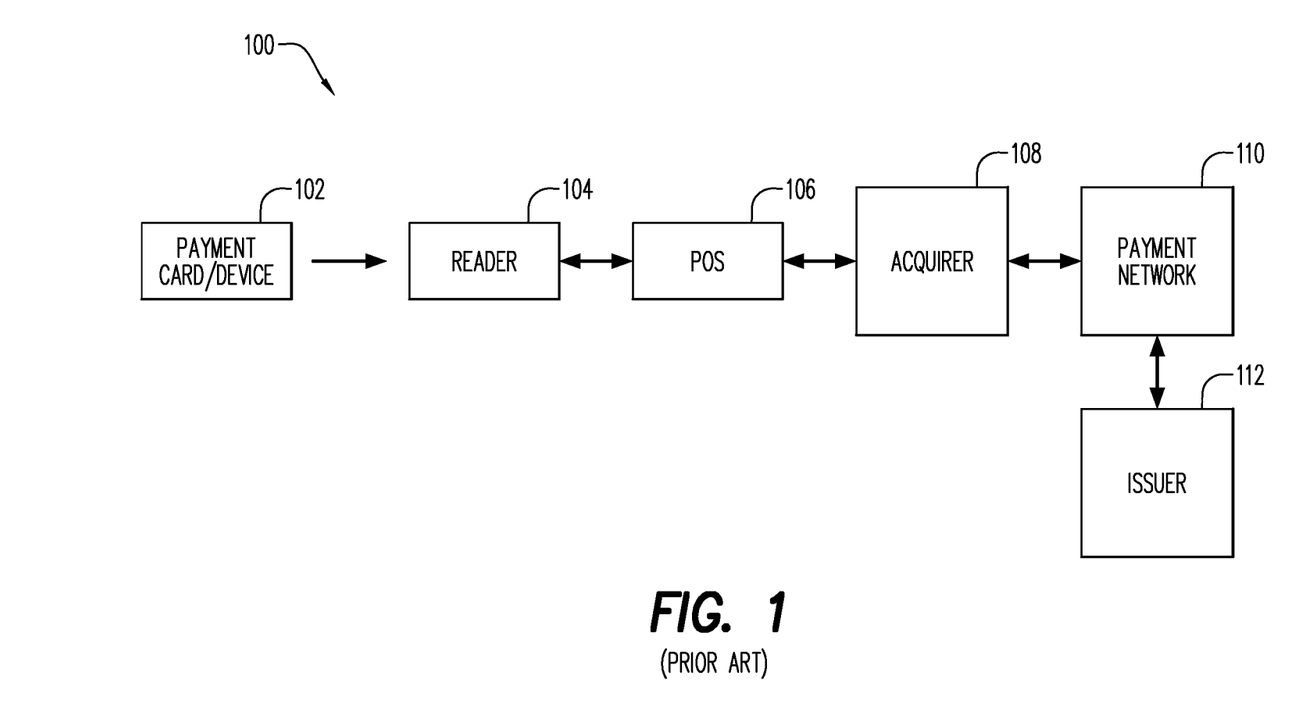
FIG. 1 is a block diagram of a conventional payment system.

FIG. 1 is a block diagram of a conventional payment system 100.

The system 100 includes a conventional payment card/device 102. With pertinence to the present disclosure, the payment device 102 may be a payment-enabled mobile device that stores credentials for a number of payment accounts and runs a wallet app, as well as one or more payment apps. The system 100 further includes a reader component 104 associated with a POS terminal 106. In some known manner (depending on the type of the payment device 102) the reader component 104 is capable of reading the payment account number and other information from the payment device 102.

The reader component 104 and the POS terminal 106 may be located at the premises of a retail store and operated by a sales associate of the retailer for the purpose of processing retail transactions.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment account that is associated with the payment card/device 102. As is also well known, the authorization response generated by the payment account issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment account issuer server computer 112 may be operated by or on behalf of a financial institution ("FI") that issues payment accounts to individual users. For example, the payment account issuer server computer 112 may perform such functions as (a) receiving and responding to requests for authorization of payment account transactions to be charged to payment accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated proximity reader components. The system may also include a very large number of payment account holders, who carry payment devices for initiating payment transactions by presenting a payment account number to the reader component of a POS terminal.

Figure 2:
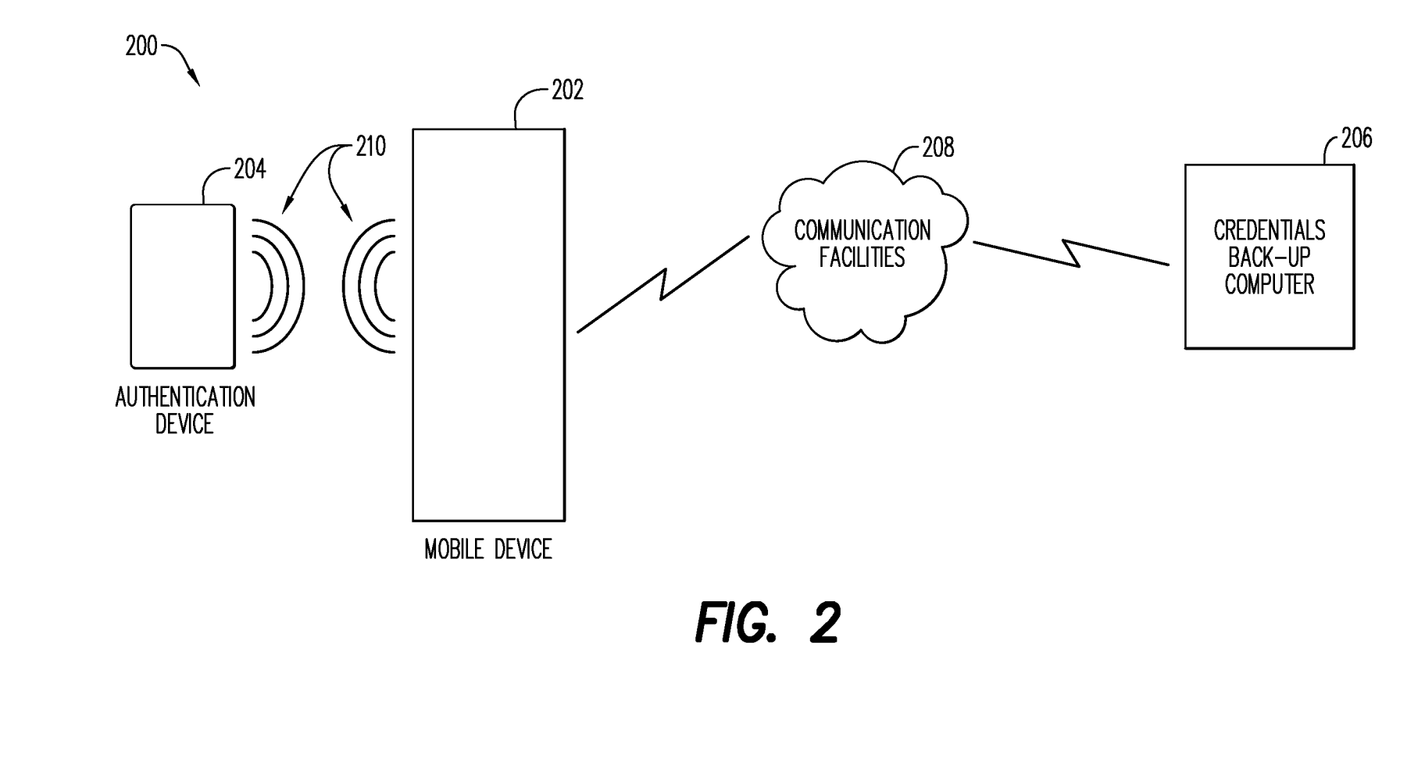
FIG. 2 is a block diagram that illustrates a system for providing access to payment credentials to a mobile device from a credentials back-up service in accordance with aspects of the present disclosure.

FIG. 2 is a block diagram that illustrates a system 200 provided in accordance with aspects of the present disclosure. The system 200 facilitates provision of credentials back-up services to users of mobile devices such as the device 202 shown in FIG. 2. For purposes of illustration, the mobile device 202 is assumed to be a payment-enabled smartphone. Details of the mobile device 202 will be described below with reference to FIG. 4. With respect to a conventional payment system such as that shown in FIG. 1, the mobile device 202, at least potentially, may incorporate the functionality of the payment device 102 shown in FIG. 1.

Also shown in FIG. 2 is an authentication device 204. Details of the authentication device 204 will be described below, partly in conjunction with FIGS. 3 and 3A.

Also shown as part of the system 200 is a credentials back-up computer 206. In some embodiments, the credentials back-up computer 206 may serve as a central, secure, but remotely accessible, repository of payment credentials data for a population of users of mobile devices. Details of the credentials back-up computer 206 will be described below in connection with FIG. 5, and additional functional aspects will be described in connection with FIGS. 6A and 6B.

Reference numeral 208 indicates communication facilities by which the mobile device is connected for purposes of data communication with, e.g., the credentials back-up computer 206. The communication facilities 208, for example, may include portions of a mobile communications network (not separately shown) for which the mobile device 202 is a subscriber device. Moreover, the communication facilities 208 may include portions of the Internet or other data networks (not separately shown) so that a data communication channel may be established between the mobile device 202 and the credentials back-up computer 206.

A practical embodiment of the system 200 may include numerous instances of the mobile device 202 and the authentication device 204, which may be used and/or held for future use by numerous individuals/users (not shown).

Figure 3:
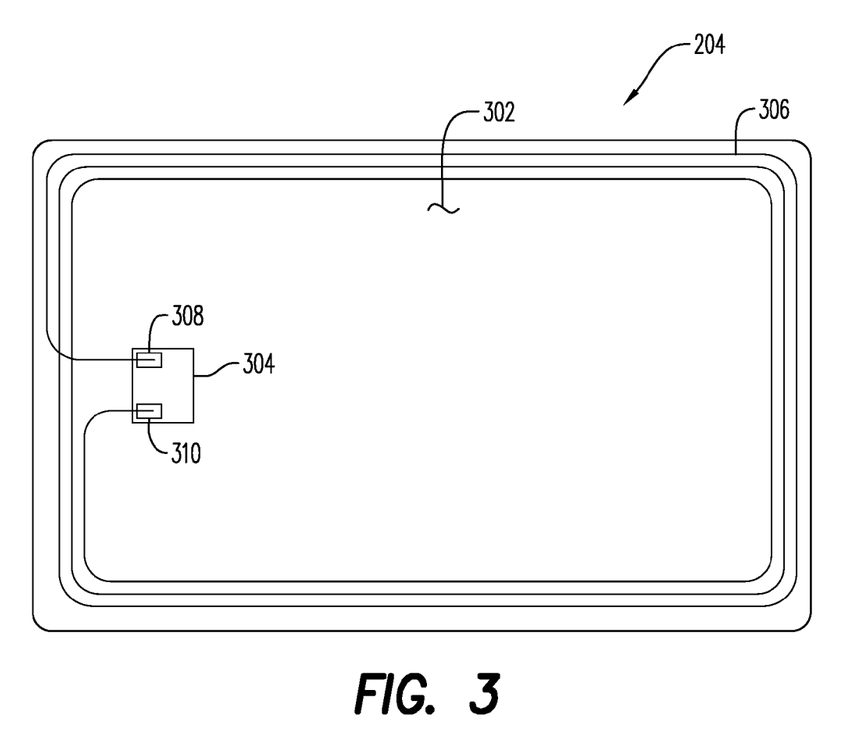
FIG. 3 is a schematic plan view of a user authentication device provided in accordance with aspects of the present disclosure and shown as part of the system of FIG. 2.

FIG. 3 is a schematic plan view of an embodiment of the authentication device 204 shown in FIG. 2. In its hardware aspects, the authentication device 204 may resemble a typical contactless IC (integrated circuit) payment card.

In the embodiment shown in FIG. 3, the authentication device 204 may include a support structure 302 that has an outer surface that defines a card shaped body. The card shaped body may have the same form factor as a conventional payment card and may be similar in construction to a payment card, i.e., formed from one or more layers of plastic (not separately indicated).

The authentication device 204 further includes an IC 304 and an antenna 306, both supported in or on the support structure 302. As seen from FIG. 3A, the IC 304 may include a processor 320, a memory 322 and a communications transceiver 324. The communications transceiver 324 may couple the processor 320 to the antenna 306. Continuing to refer to FIG. 3A, the memory 322 may be in communication with the processor 320 and may store program instructions. The program instructions may control the processor 320 to perform functions as described herein. The processor 320 may control the communications transceiver 324 so that the processor 320 is enabled to receive and transmit data via the transceiver 324 in the form of short-range data communications.

As shown in FIG. 3, the antenna 306 may comprise several loops along the periphery of the support structure 302.

Figure 3A:
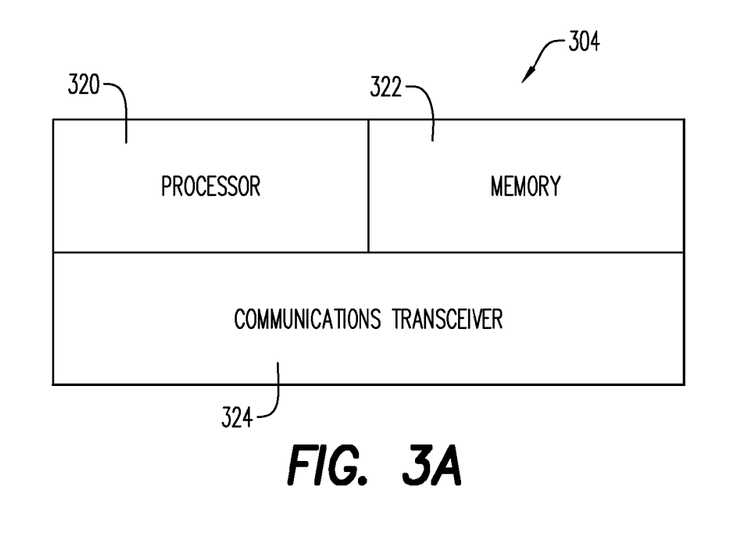
FIG. 3A is a block diagram that shows some details of the authentication device of FIG. 3.

The IC 304 may include electrically conductive contact pads 308 and 310, by which the communications transceiver 324 of the IC 304 may be electrically connected to the antenna 306.

The authentication device 204 (FIG. 3) may be personalized by storage of user-specific data in the memory 322 (FIG. 3A) of the IC 304.

In some embodiments, the authentication device 204 may lack many, and perhaps all, of the visible/human readable information and other visible features commonly present on a typical IC payment card. Thus, the authentication device 204 may lack any visible payment account number, expiration date, etc. By the same token, the authentication device 204 may differ from a typical IC payment card in that the former may not electronically store any payment account number or substitute therefor. Moreover, the authentication device 204 may entirely lack any data related to a particular payment account and thus may not store any payment account credentials at all. More generally, the authentication device 204 may not store any of the credentials data referred to below in conjunction with the description of the credentials back-up computer 206. In some embodiments, the authentication device 204 may store one or more application programs and related data as required for it to play its role in a user authentication and mobile device authentication process as described below in connection with FIGS. 6A and 6B. The authentication-related information stored in the authentication device 204 (i.e., in the IC 304) may include one or more cryptographic keys (e.g., a public key) as is well known in the art, as well as data required for the authentication device 204 to verify user authentication information to be provided by the user in connection with the process of FIGS. 6A and 6B.

It may further be the case that the authentication device 204 lacks any visible branding of a payment network or of a payment account issuer. In some embodiments, the authentication device 204 may include visible branding (not shown) of the provider of credentials data back-up services via the credentials back-up computer 206. It may also be desirable that the name and residential address of the user of the authentication device 204 be visibly reproduced on the authentication device 204.

Figure 4:
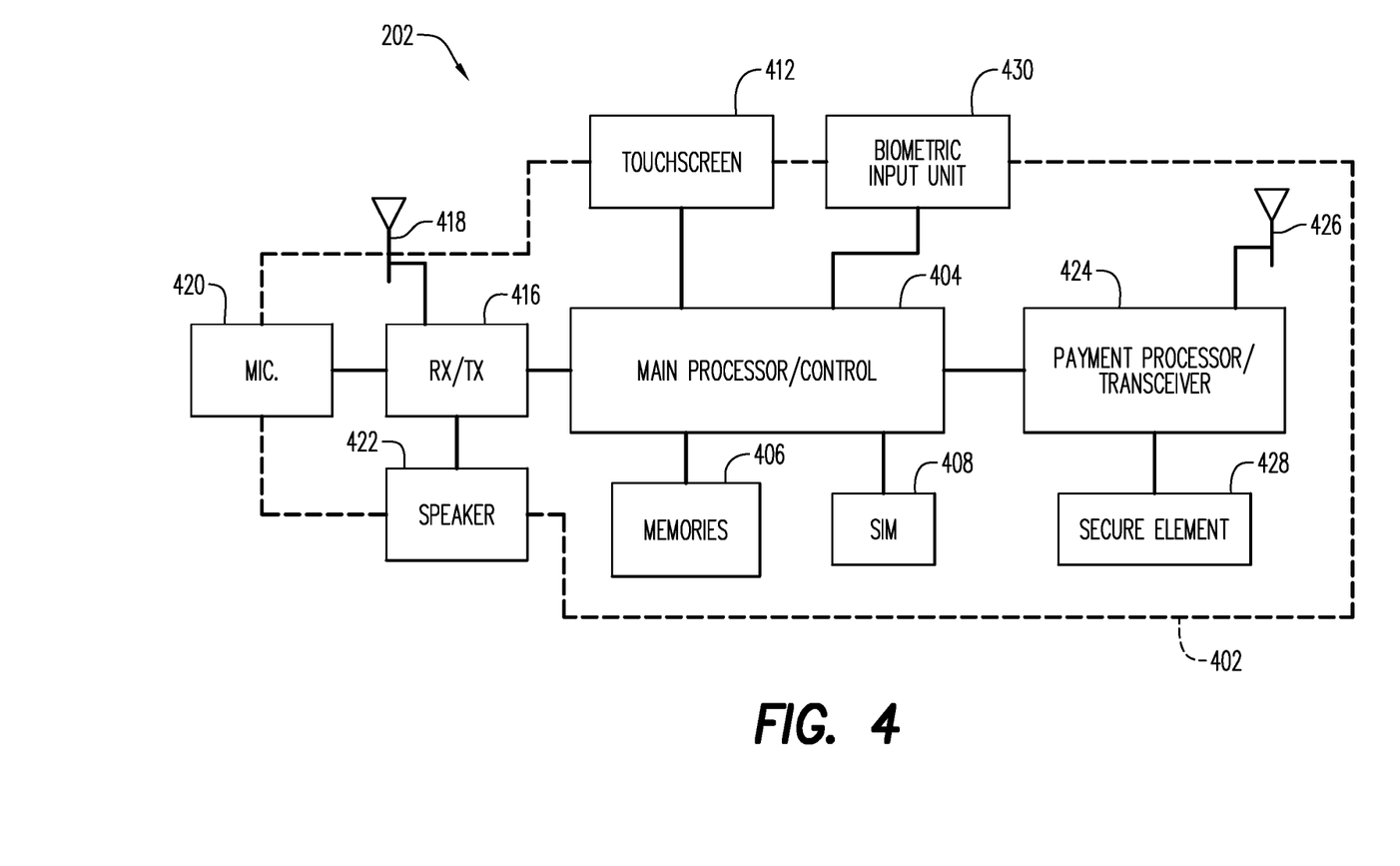
FIG. 4 is a block diagram of a payment-enabled mobile device provided in accordance with aspects of the present disclosure and that may be used in connection with the system of FIG. 2.

FIG. 4 is a block diagram that illustrates an example embodiment of the mobile device 202 shown in FIG. 2 and provided in accordance with aspects of the present disclosure. The mobile device 202 may be conventional in its hardware aspects. For example, the mobile device 202 may be a smartphone, and may resemble, in some or all of its hardware aspects and many of its functions, common commercially available smartphones. Alternatively, the mobile device 202 may be a tablet computer with mobile telecommunications capabilities. The ensuing description of the mobile device 202 is based on the assumption that it is embodied as a smartphone; those who are skilled in the art will readily understand from the following description how to embody the mobile device 202 as a tablet computer or other device apart from a smartphone.

The mobile device 202 may include a conventional housing (indicated by dashed line 402 in FIG. 4) that contains and/or supports the other components of the mobile device 202. The housing 402 may be shaped and sized to be held in a user's hand, and may, for example, exhibit the type of form factor that is common with the current generation of smartphones.

The mobile device 202 further includes conventional control circuitry 404, for controlling over-all operation of the mobile device 202. For example, the control circuitry 404 may include a conventional processor of the type designed to be the "brains" of a smartphone.

Other components of the mobile device 202, which are in communication with and/or controlled by the control circuitry 404, include: (a) one or more memory or storage devices 406 (e.g., program and working memory, etc.); (b) a conventional SIM (subscriber identification module) card 408; (c) a conventional touchscreen 412 which serves as the primary input/output device for the mobile device 202, and which thus receives input information from the user and displays output information to the user. As is the case with many models of smartphones, in some embodiments, the mobile device 202 may also include a few physically-actuatable switches/controls (not shown), such as an on/off/reset switch, a menu button, a "back" button, a volume control switch, etc. It may also be the case that the mobile device 202 includes a conventional digital camera, which is not explicitly shown.

The mobile device 202 also includes conventional receive/transmit circuitry 416 that is also in communication with and/or controlled by the control circuitry 404. The receive/transmit circuitry 416 is coupled to an antenna 418 and provides the communication channel(s) by which the mobile device 202 communicates via the mobile telephone communication network (which, e.g., is included in the above-mentioned communication facilities 208, FIG. 2).

Continuing to refer to FIG. 4, the receive/transmit circuitry 416 may operate both to receive and transmit voice signals, in addition to performing data communication functions. As is known to those who are skilled in the art, such data communication may be via HTTP (HyperText Transfer Protocol) or other communication protocol suitable for carrying out data communication over the internet.

The mobile device 202 further includes a conventional microphone 420, coupled to the receive/transmit circuitry 416. Of course, the microphone 420 is for receiving voice input from the user. In addition, a speaker 422 is included to provide sound output to the user, and is coupled to the receive/transmit circuitry 416.

The receive/transmit circuitry 416 may operate in a conventional fashion to transmit, via the antenna 418, voice signals generated by the microphone 420, and to reproduce, via the speaker 422, voice signals received via the antenna 418. The receive/transmit circuitry 416 may also handle transmission and reception of text messages and other data communications via the antenna 418.

The mobile device 202 may also include payment processor/transceiver circuitry 424 that is partly or wholly dedicated to implementing NFC communications functionality of the mobile device 202. The mobile device 202 may further include a loop antenna 426, coupled to the NFC circuitry 424. In some embodiments, the NFC circuitry 424 may partially overlap with the control circuitry 404 for the mobile device 202. Moreover, the NFC circuitry 424 is associated with, and may also overlap with, a secure element (SE) 428 that is part of the mobile device 202 and is contained within the housing 402. The term "secure element" is well known to those who are skilled in the art, and typically refers to a device that may include a small processor and volatile and nonvolatile memory (not separately shown) that are secured from tampering and/or reprogramming by suitable measures. In some embodiments, the secure element 428 may be provided as part of the SIM card 408. In other embodiments, the secure element 428 may be constituted by an integrated circuit card separate from the SIM card 408, but possibly having the same form factor as the SIM card 408. In some embodiments of the mobile device 202, the secure element 428 may be conventional in its hardware aspects. In some embodiments, functionality as described below may be programmed into the secure element and/or other processing elements in the mobile device 202 in accordance with aspects of the present disclosure. (It should be noted that the term "secure element" is not intended to be limited to devices that are IC-based, but rather, may also include any secure execution environment in a mobile device, and may include software based secure execution environments running on the main mobile device processor.) In some embodiments, the secure element 428 may be provisioned or pre-programmed with one or more payment application programs ("apps") such that the mobile device is enabled to operate as a payment device vis-à-vis POS terminals (assuming that the mobile device is also provisioned with payment account credentials data).

For the purpose of conducting payment account transactions, the mobile device 202 may communicate with POS terminals via the antenna 426 in accordance with the NFC communication standard. Further, according to aspects of the present disclosure, the secure element 428 or other programmable component(s) of the mobile device 202 may be programmed such that the mobile device 202 is enabled to interact with an authentication device, such as that described herein and in a manner described below in connection with FIGS. 6A and 6B. For this purpose, for example, a user/device authentication app may be installed in the mobile device 202 to enable the authentication functionality described herein.

As will be understood from subsequent discussion, authentication of the user of the mobile device 202 may include gathering of biometric information from the user by the mobile device. Fingerprint scanning, facial recognition processing and/or voice recognition processing are among the possible modes of biometric authentication of the user. Block 430 in FIG. 4 represents one or more hardware and/or software features of the mobile device 202 that enable biometric data input to the mobile device. The biometric input unit 430 may be stand-alone relative to other hardware features of the mobile device 202 or may be incorporated in or overlap with other hardware features. For example, the touchscreen 412 may incorporate a fingerprint scanning function; the microphone 420 may serve as an input for voice utterances of the user to be employed for voice recognition; and/or the camera (not shown apart from block 430) may be employed to capture an image of the user's face or retina for facial/retina recognition purposes. Other types of biometric user authentication may also or alternatively be employed, including gait recognition, electronic keypad interaction pattern recognition, and/or other types of biometric measures previously proposed or proposed subsequent to the time of this disclosure.

It should also be understood that the mobile device 202 may be operable as a conventional mobile telephone for communication—both voice and data—over a conventional mobile telecommunications network, which is not depicted in the drawing apart from element 208 in FIG. 2. Thus, the mobile device 102 may be in communication from time to time in a conventional manner with a mobile network operator ("MNO"—not shown).

As is familiar to those who are skilled in the art, the mobile device 202 may be viewed as a small computing device. The mobile device 202 may include one or more processors that are programmed by software, apps and/or other processor-executable steps to provide functionality as described herein. The software, apps and/or other processor-executable steps may be stored in one or more computer-readable storage media (such as the storage devices 406 and/or the secure element 428) and may comprise program instructions, which may be referred to as computer readable program code means. Through its computing and data communication capabilities, the mobile device 202 may have capabilities for engaging in remote communications with the credentials back-up computer 206.

Figure 5:
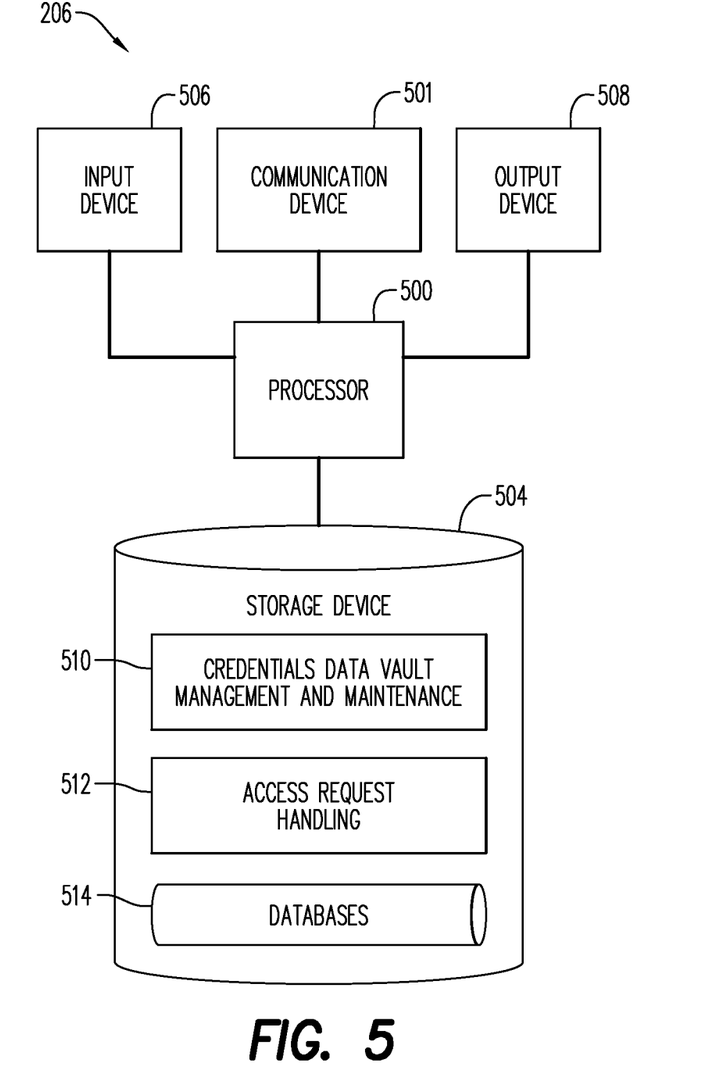
FIG. 5 is a block diagram that illustrates a computer system that may be operated as part of the system of FIG. 2 and in accordance with aspects of the present disclosure.

FIG. 5 is a block diagram that illustrates an example embodiment of the payment credentials back-up computer 206 shown in FIG. 2. The credentials back-up computer 206 may also sometimes be referred to as a "back-up services computer."

The credentials back-up computer 206 may be constituted by standard components in terms of its hardware and architecture, but may be controlled by software to cause it to function as described herein. For example, the credentials back-up computer 206 may be constituted by server computer hardware.

The credentials back-up computer 206 may include a computer processor 500 operatively coupled to a communication device 501, a storage device 504, an input device 506 and an output device 508.

The computer processor 500 may be constituted by one or more processors. Processor 500 operates to execute processor-executable steps, contained in program instructions described below, so as to control the credentials back-up computer 206 to provide desired functionality.

Communication device 501 may be used to facilitate communication with, for example, other devices (such as numerous mobile devices seeking credentials data loading services and/or other devices that submit credentials data for storage in the credentials back-up computer 206 in a user's partition maintained in the credentials back-up computer 206). For example (and continuing to refer to FIG. 5), communication device 501 may comprise numerous communication ports (not separately shown), to allow the credentials back-up computer 206 to communicate simultaneously with a number of other computers and other devices.

Input device 506 may comprise one or more of any type of peripheral device typically used to input data into a computer. For example, the input device 506 may include a keyboard and a mouse. Output device 508 may comprise, for example, a display and/or a printer.

Storage device 504 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 504 stores one or more programs for controlling processor 500. The programs comprise program instructions (which may be referred to as computer readable program code means) that contain processor-executable process steps of the credentials back-up computer 206, executed by the processor 500 to cause the credentials back-up computer 206 to function as described herein.

The programs may include one or more conventional operating systems (not shown) that control the processor 500 so as to manage and coordinate activities and sharing of resources in the credentials back-up computer 206, and to serve as a host for application programs (described below) that run on the credentials back-up computer 206.

The storage device 504 may store a credentials data vault management and maintenance program 510 that controls the processor 500 to enable the credentials back-up computer 206 to act as a credentials data repository for a large base of users/subscribers. In some embodiments, the program 510 may allow users to enroll and establish dedicated data partitions for themselves in the credentials back-up computer 206. The program 510 may also operate to receive and store in each user's partition respective credentials data. In some embodiments, the stored credentials data may include payment credentials relating to one or more payment accounts for a given user. In some embodiments, the payment credentials stored for a given user may include credentials relating to two, three or more payment accounts of different types and/or from different account issuers. The different types of payment accounts may include credit, debit, prepaid, or other types of accounts typically used for transactions involving payment networks. In some embodiments, the credentials for a given account may include, e.g., an account number or substitute (payment token), expiration date, security code (e.g., CVC), account holder's name, etc. In some embodiments, the account issuers may include a number of different financial institutions. In some embodiments, the credentials may include data that supports functionality in addition to or instead of payment transactions. For example, such functionality may include transit system access; building, facility or room access; customer loyalty account identifiers; proof of membership (e.g., to a health club or other private facility); proof of identity—including, for example, a driver's license, a passport, voter registration, or a digitized version of any other kind of identity card.

Continuing to refer to FIG. 5, the programs stored in the storage device 504 may also include an access request handling application program 512 that controls the processor 500 to enable the credentials back-up computer 206 to handle requests for access to the back-up credentials data stored in the credentials back-up computer 206. The manner in which such requests may occur and may be handled will be described below, particularly with reference to FIGS. 6A and 6B.

The storage device 504 may also store, and the credentials back-up computer 206 may also execute, other programs, which are not shown. For example, such programs may include a reporting application, which may respond to requests from system administrators for reports on the activities performed by the credentials back-up computer 206. The other programs may also include, e.g., one or more data communication programs, database management programs, device drivers, etc.

The storage device 504 may also store one or more databases 514 required for operation of the credentials back-up computer 206. For example, the back-up credentials data referred to above may be stored as one or more of the databases 514.

Figure 6A:
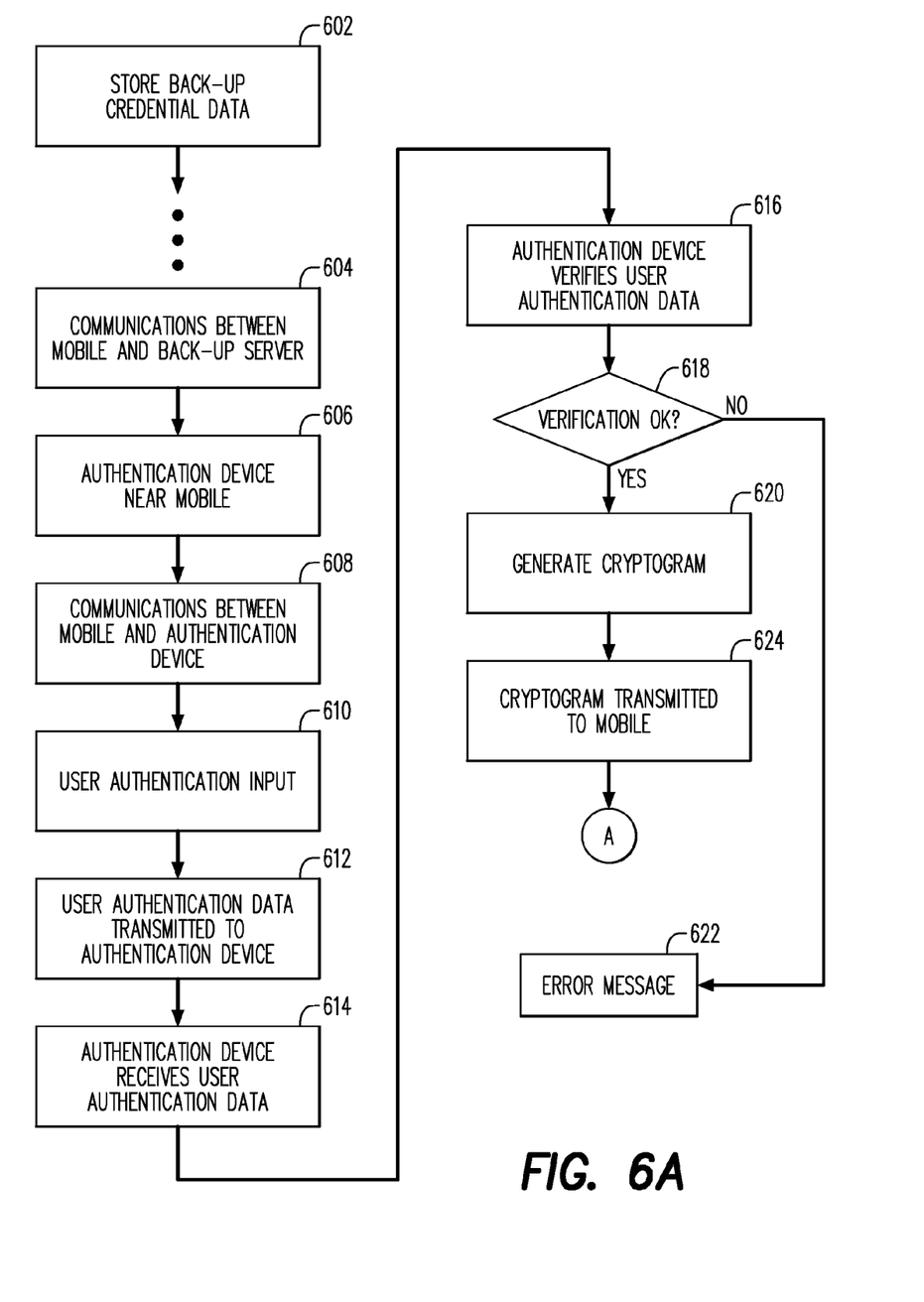
FIGS. 6A and 6B together form a flow chart that illustrates a process that may be performed in the system of FIG. 2 in accordance with aspects of the present disclosure.
Figure 6B:
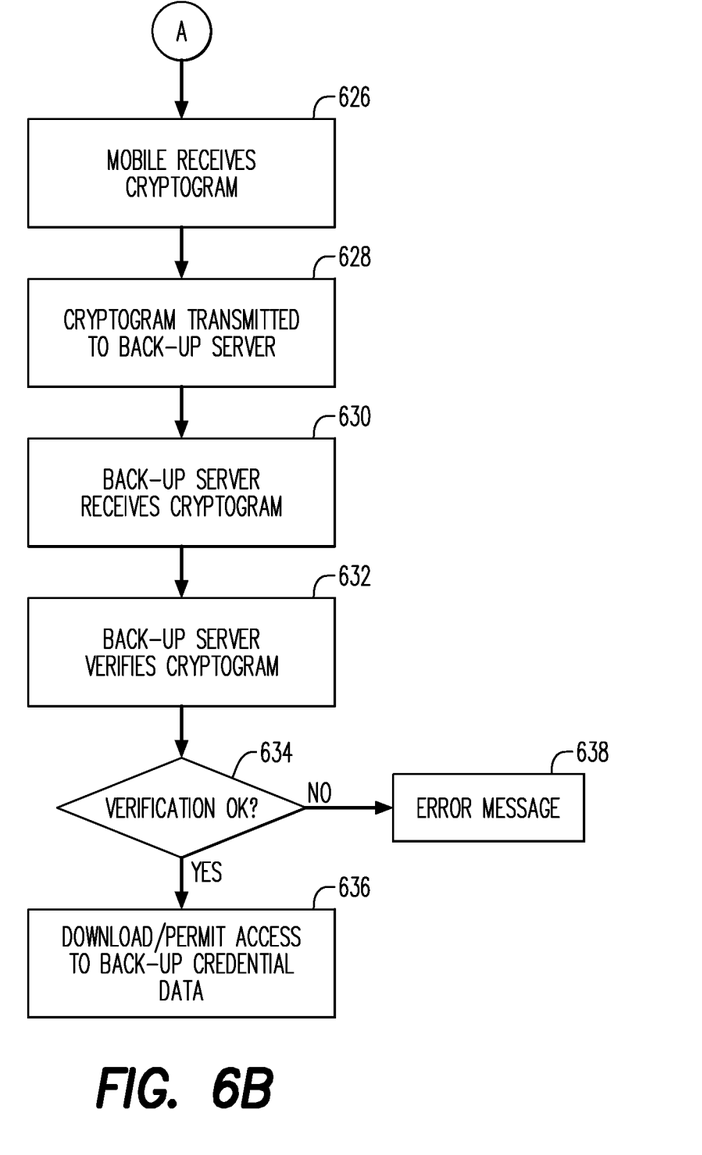

FIGS. 6A and 6B together form a flow chart that illustrates a process that may be performed in the system 200 shown in FIG. 2, in accordance with aspects of the present disclosure.

At 602, credentials data is stored in the credentials back-up computer 206 for a particular user. This may occur in a number of ways. For example, the user of a mobile device (not shown, and assumed not to be the mobile device 202 shown in FIG. 2) that has been loaded with credential data may access a website hosted by the credentials back-up computer 206. The user may operate the mobile device to establish an account as a subscriber to the credentials data back-up service provided through the credentials back-up computer 206. As part of the same process, the user may operate the mobile device to upload the credentials data that has been stored therein. The credentials data may, for example, include some or all of the types of data enumerated above in connection with the description of the back-up vault management software application 510 shown in FIG. 6A. To reiterate just one example of such data, the credentials data uploaded from the mobile device may include payment credentials for a number of different payment accounts that are accessible via a wallet application that runs on the mobile device. In some embodiments, the mobile device may also upload biometric data related to the user. This biometric data may serve as reference data for a subsequent user authentication process to be described below. In addition or alternatively, the mobile device may upload a PIN, selected by the user, to be utilized for subsequent user authentication.

Alternatively, one or more account issuers or wallet service providers that have a relationship with the user may facilitate the user's subscription to the back-up service and/or may transfer credentials data for the user to be stored in the user's partition in the credentials back-up computer 206. Other issuers of digitized or digitizable credentials may similarly transfer credentials data for the user to the credentials back-up computer 206.

In connection with the user's opening of a subscriber account with the credentials back-up computer 206 and/or in connection with storage of the user's credentials data in the credentials back-up computer 206, the operator of the credentials back-up computer 206 may issue to the user the above-mentioned authentication device 204 (FIGS. 2 and 3). In some embodiments, for example, the authentication device 204 may be sent to the user by postal mail. It may be the case that the mailing package for the authentication device 204 may suggest to the user that he/she should keep the authentication device 204 in a secure location in his/her residence, and not carry the authentication device 204 on his/her person. The mailing package may also contain instructions as to how the user can access the back-up credentials data using the authentication device 204. In some embodiments, the authentication device 204, as issued by the operator of the credentials back-up computer 206, may store user authentication reference data, such as a PIN or biometric reference data for the user. That is, the credentials back-up computer 206 may, as part of issuance of the authentication device 204, load into the authentication device 204 user authentication reference data previously uploaded to, or generated by, the credentials back-up computer 206.

In some embodiments, the authentication device 204 may be issued to the user by an issuer of one or more of the user's payment accounts. In doing so, the account issuer may be operating in cooperation with and in place of the operator of the credentials back-up computer 206. In some embodiments, the operator of the credentials back-up computer 206 may be an account issuer and/or a financial institution. In such a case, the back-up credentials service may be offered by the account issuer as a supplement to payment account services and/or other services that the account issuer provides to the user.

It will now be assumed that, after a lapse of time following the storage of the user's credentials data in the credentials back-up computer 206 and issuance of the authentication device 204, the user needs or wants to replace his/her mobile device. It is also assumed that the user has been using the to-be-replaced device to access various credentials, including, for example, payment account credentials used for payment account transactions. A further assumption is that the user has obtained the replacement mobile device, which is indicated by reference numeral 202 in FIG. 2. Accordingly, the user may initiate a process of accessing his/her stored back-up credentials via his/her new mobile device 202. This may involve the user interacting with an app on the mobile device 202 such that the mobile device enters into communications (block 604, FIG. 6A) with the credentials back-up computer 206. (In some embodiments, the commencement of communications between the mobile device 202 and the credentials back-up computer 206 may be delayed to a later stage of the process of FIG. 6A/6B.)

At 606 in FIG. 6A, the user may bring the authentication device 204 into proximity with the mobile device 202. The mobile device 202 may interrogate the authentication device 204, bringing about short-range wireless data communications between the two devices, as indicated at 210 in FIG. 2, and by block 608 in FIG. 6A. In some embodiments, the communication between the mobile device 202 and the authentication device 204 may be in accordance with the NFC (near field communication) standard.

The mobile device 202 may then prompt the user to provide input to authenticate himself/herself. In some embodiments, this may include the user entering a PIN (personal identification number) into the mobile device 202. In addition or alternatively, the user may provide his/her thumb/finger for fingerprint scanning by the mobile device 202. Other types of biometric input are also or alternatively possible, as referred to above. The input of the user authentication data by the user into the mobile device 202 is represented by block 610 in FIG. 6A.

At block 612 in FIG. 6A, the mobile device 202 transmits the user authentication data to the authentication device 204. At block 614, the authentication device 204 receives the user authentication data from the mobile device 202.

At block 616, the authentication device 204 performs a verification process with respect to the user authentication data. That is, the authentication device 204 verifies the user authentication data. In a case where the authentication data is a PIN entered into the mobile device 202 by the user, the verification process may involve the authentication device 204 determining whether the authentication data matches reference PIN data that was stored in the authentication device 204 at the time the authentication device 204 was issued. In a case where the authentication data is derived from a biometric measure performed by the mobile device 202, the verification process may involve the authentication device 204 determining whether the authentication data matches reference biometric data that was previously obtained from a like biometric measure with respect to the user and stored in the authentication device 204 at the time the authentication device 204 was issued.

A decision block 618 may follow block 616 in the process of FIG. 6A. At decision block 618, the authentication device 204 may determine whether the verification process of block 616 was performed successfully. If so, then block 620 may follow decision block 618. That is, execution of block 620 may depend on a result of the verification process.

At block 620, the authentication device 204 may generate a cryptogram, as is known in the relevant art. For example, the authentication device 204 may employ a public cryptographic key stored in the authentication device 204 to digitally sign an unpredictable challenge value transmitted to the authentication device 204 from the mobile device 202. The unpredictable challenge value may have been generated by a random or pseudo-random process in the mobile device 202 in connection with the user authentication process and transmitted along with (or shortly before or after) transmission of the authentication data from the mobile device 202 to the authentication device 204. The digitally signed unpredictable value is one type of cryptogram that the authentication device 204 may generate in some embodiments of block 620. In other embodiments, the authentication device 204 may perform other types of cryptographic processes to generate the cryptogram.

Referring again to decision block 618, if a negative determination is made at that decision block (i.e., if the authentication device 204 determines that the verification process was not successful), then block 622 may follow decision block 618. At block 622, the authentication device 204 may prompt the mobile device 202 to display an appropriate error message to the user, and the process of FIGS. 6A/6B may then end.

Considering again block 620 in FIG. 6A, block 624 may follow block 620. At block 624, the authentication device may transmit, to the mobile device 202, the cryptogram generated by the authentication device 204 at block 620.

At block 626 in FIG. 6B, the mobile device 202 may receive the cryptogram transmitted by the authentication device 204 at 624.

Continuing to refer to FIG. 6B, at block 628 the mobile device 202 may transmit the cryptogram to the credentials back-up computer 206. At the same time, the mobile device 202 may transmit, to the credentials back-up computer 206, data provided from the mobile device 202 that was used by the authentication device 204 to generate the cryptogram.

At block 630, the credentials back-up computer 206 may receive the cryptogram transmitted from the mobile device 202 at 628. At block 632, the credentials back-up computer 206 may perform a verification process with respect to the cryptogram it received at 630. That is, the credentials back-up computer 206 verifies the cryptogram. For example, where the cryptogram was generated by the authentication device 204 by using a public key, the credentials back-up computer 206 may decrypt the cryptogram using the corresponding private key. The credentials back-up computer 206 may then determine whether the decrypted result matches an expected value (e.g., an unpredictable value produced by the mobile device 202 and supplied to both the authentication device 204 and the credentials back-up computer 206).

A decision block 634 may follow block 632 in the process of FIG. 6B. At decision block 634, the credentials back-up computer 206 may determine whether the verification process of block 632 was performed successfully. If so, then block 636 may follow decision block 634. That is, execution of block 636 may depend on a result of the verification process of block 632.

At block 636, the credentials back-up computer 206 may make the back-up credentials data available to the mobile device 202. For example, this may include downloading all of the back-up credentials data for the user to the mobile device 202. For example, the back-up credentials data may be downloaded for storage in the SE 428 (FIG. 4) in the mobile device 202. In other embodiments, some or all of the back-up credentials data may be provided to a server computer (not shown) that serves as a remote host for credentials data to be accessed via a secure execution environment (SEE) on the mobile device 202. In some embodiments, the credentials back-up computer 206 itself, or an associated computer system, may serve as the remote host for credentials data for the SEE on the mobile device 202.

In conjunction with making the back-up credentials data accessible to the mobile device 202, the credentials back-up computer 206 may take appropriate steps to block any other or previous mobile device (not shown) from using/accessing the credentials data that was previously accessible to the previous mobile device. For example, the credentials back-up computer 206 may perform a "remote wipe" operation on the previous mobile device, at least with respect to the relevant credentials data. In addition or alternatively, the credentials back-up computer 206 may provide notice to account issuers and/or other issuers of the credentials that the old mobile device has been replaced by the mobile device 202 in terms of accessing the credentials.

Referring again to decision block 634 in FIG. 6B, if a negative determination is made at decision block 634 (i.e., if the credentials back-up computer 206 determines that the verification process of block 632 was not successful), then block 638 may follow decision block 634. At block 638, the credentials back-up computer 206 may prompt the mobile device 202 to display an appropriate error message to the user, and the process may end. It will be recognized that in this case the mobile device may not be permitted access to the back-up credentials data for the user, or may be required to retry the process.

With a process as described above, and particularly with an authentication device such as that described herein, shifting credentials data from an old (or lost or stolen) mobile device to a new mobile device may be accomplished with a high degree of convenience for the user, and also with a high degree of security for preventing unauthorized access to the credentials data. Because of the security afforded by the authentication device, it may be feasible to omit ID&V (identification and verification) processes that account issuers might otherwise require for provisioning existing payment accounts to a new mobile device.

In embodiments described above, the authentication device 204 was illustrated as being card-shaped (e.g., akin to a conventional payment card in shape and size). Alternatively, however, the authentication device may be provided in other form factors, such as fobs, wristbands, etc.

In addition to or instead of providing back-up services with respect to credentials data, the credentials back-up computer 206 may provide similar services with respect to contact lists, appointment data, text message threads, photographs and any other personal data typically stored by users on their mobile devices. To support such functionality, mobile devices may periodically "sync up" with the credentials back-up computer 206 to update the back-up data to be transferred upon the user's adoption of a new mobile device.

In embodiments described above, the credentials back-up computer 206 has been portrayed as a centralized computer resource serving many mobile device users. However, in other embodiments, the back-up function may be locally implemented on, e.g., a personal computer/server that the mobile device user owns and controls, and has located in his/her residence.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment account" includes a credit card account, a deposit account that the account holder may access using a debit card, a prepaid card account, or any other type of account from which payment transactions may be consummated. The terms "payment account," "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment system" refers to a system for handling purchase transactions and related transactions. An example of such a system is the one operated by MasterCard International Incorporated, the assignee of the present disclosure. In some embodiments, the term "payment system" may be limited to systems in which member financial institutions issue payment accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
   establishing a communication channel between a mobile device and a back-up service computer, said mobile device configured to engage in mobile telecommunications via a mobile telecommunications network, said communication channel constituted at least in part by said mobile telecommunications network;
   exchanging short-range wireless data communications between an authentication device and the mobile device;
   entering user authentication data into the mobile device;
   transmitting the user authentication data from the mobile device to the authentication device;
   receiving the user authentication data in the authentication device;
   verifying the received user authentication data in the authentication device;
   in response to a result of the verifying step, generating a cryptogram in the authentication device;
   transmitting the cryptogram from the authentication device to the mobile device;
   receiving the cryptogram in the mobile device; and
   transmitting the cryptogram from the mobile device to the back-up services computer.

2. The method of claim 1, wherein the back-up services computer is remote from the mobile device.

3. The method of claim 1, wherein the mobile device is a smartphone.

4. The method of claim 1, further comprising:
   receiving, by the mobile device, a download of back-up credentials data from the back-up service computer.

5. The method of claim 1, wherein the downloaded back-up credentials data includes payment account credentials.

6. The method of claim 5, wherein the payment account credentials include at least one of: (a) a PAN (primary account number); and (b) a payment token.

7. The method of claim 5, wherein the payment account credentials include credentials for a plurality of payment accounts.

8. The method of claim 7, where the plurality of payment accounts include a first payment account issued by a first account issuer and a second payment account issued by a second account issuer different from the first account issuer.

9. The method of claim 1, wherein the user authentication data includes a PIN (personal identification number).

10. The method of claim 1, wherein the user authentication data includes user biometric data.

11. The method of claim 1, wherein the user biometric data represents a scan of the user's fingerprint.

12. The method of claim 1, further comprising:
   prior to said generating step,
      randomly or pseudo-randomly generating challenge data in the mobile device and transmitting the challenge data to the authentication device;
   and wherein the step of generating the cryptogram in the authentication device includes performing cryptographic processing, said challenge data being an input to said cryptographic processing.

13. A mobile device, comprising:
   a housing;
   a processor contained within the housing;
   a memory contained within the housing and in communication with the processor;
   a short-range data communication transceiver contained within the housing and controlled by the processor; and
   a mobile telecommunications transceiver contained within the housing and controlled by the processor;
   the memory storing program instructions, the processor operative with the program instructions to perform functions as follows:

establishing a communication channel via the mobile telecommunications transceiver with a back-up service computer;

exchanging short-range wireless data communications with an authentication device via the short-range data communication transceiver;

receiving user authentication data;

transmitting the user authentication data to the authentication device;

receiving a cryptogram from the authentication device; and transmitting the received cryptogram to the back-up service computer.

14. The mobile device of claim 13, wherein the processor is further operative with the program instructions to perform functions as follows prior to the receiving step:

generating challenge data; and transmitting the challenge data to the authentication device.

15. The mobile device of claim 13, wherein the processor is further operative with the program instructions to perform a function as follows subsequent to the step of transmitting the received cryptogram:

receiving a download of back-up credentials data from the back-up service computer.

16. The mobile device of claim 15, wherein the downloaded back-up credentials data includes payment account credentials.

17. A method comprising:

storing back-up credentials data for a user;

establishing a communications channel with a mobile device;

receiving a cryptogram and challenge data from the mobile device, the cryptogram relayed by the mobile device from an authentication device that interacted with the mobile device, the authentication device associated with the user;

verifying the cryptogram by using the challenge data to verify data obtained by decrypting the cryptogram; and in response to a result of the step of verifying the cryptogram, making the stored back-up credentials data accessible to the mobile device.

18. The method of claim 17, wherein the communications channel is at least partially constituted by a mobile communications network.

19. The method of claim 17, wherein the stored back-up credentials data is made accessible to the mobile device by downloading the stored back-up credentials data to the mobile device.

20. The method of claim 19, wherein the downloaded back-up credentials data includes credentials for a plurality of payment accounts.

* * * * *